US010830133B2

(12) United States Patent
Bruno et al.

(10) Patent No.: US 10,830,133 B2
(45) Date of Patent: Nov. 10, 2020

(54) AIRCRAFT ENVIRONMENTAL CONTROL SYSTEM SELECTIVELY POWERED BY THREE BLEED PORTS

(71) Applicant: Hamilton Sundstrand Corporation, Windsor Locks, CT (US)

(72) Inventors: Louis J. Bruno, Ellington, CT (US); Thomas M. Zywiak, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 465 days.

(21) Appl. No.: 14/755,929

(22) Filed: Jun. 30, 2015

(65) Prior Publication Data

US 2015/0307183 A1 Oct. 29, 2015

Related U.S. Application Data

(63) Continuation-in-part of application No. 14/088,557, filed on Nov. 25, 2013, now Pat. No. 9,382,841.

(60) Provisional application No. 61/872,941, filed on Sep. 3, 2013.

(51) Int. Cl.
*F02C 6/08* (2006.01)
*B64D 13/06* (2006.01)

(52) U.S. Cl.
CPC ................ *F02C 6/08* (2013.01); *B64D 13/06* (2013.01); *B64D 2013/0618* (2013.01); *F05D 2220/74* (2013.01); *F05D 2260/213* (2013.01); *Y02T 50/56* (2013.01); *Y02T 50/676* (2013.01)

(58) Field of Classification Search
CPC ............................... B64D 13/04; B64D 13/06; B64D 2013/0603; B64D 2013/0618; F02C 7/18; F02C 7/185; F02C 9/18; F02C 6/04; F02C 6/06; F02C 6/08
See application file for complete search history.

(56) References Cited

U.S. PATENT DOCUMENTS

| | | | |
|---|---|---|---|
| 4,263,786 | A | 4/1981 | Eng |
| 5,063,963 | A | 11/1991 | Smith |
| 5,511,385 | A | 4/1996 | Drew et al. |
| 6,058,725 | A | 5/2000 | Monfraix et al. |
| 6,189,324 | B1 | 2/2001 | Williams et al. |

(Continued)

FOREIGN PATENT DOCUMENTS

| | | | |
|---|---|---|---|
| EP | 2492199 | A2 | 8/2012 |
| EP | 2845803 | A1 | 3/2015 |

(Continued)

OTHER PUBLICATIONS

Extended European Search Report for Application No. EP 14 17 9716; dated Feb. 17, 2015; dated Feb. 26, 2015; 6 pages.

(Continued)

*Primary Examiner* — Scott J Walthour
(74) *Attorney, Agent, or Firm* — Cantor Colburn LLP

(57) ABSTRACT

An engine compressor bleed system of an engine for an aircraft is provided including a plurality of compressor pressure ports configured to supply bleed air to satisfy a cooling load for at least a first stage of a flight profile of an aircraft. A first pressure port of the plurality of compressor pressure ports is configured to provide bleed air having a pressure at least equal to a cabin pressure of an aircraft and a temperature that does not exceed a predetermined threshold.

9 Claims, 6 Drawing Sheets

(56) References Cited

U.S. PATENT DOCUMENTS

| | | | | |
|---|---|---|---|---|
| 7,536,865 | B2 | 5/2009 | Mikhail | |
| 8,033,118 | B2 | 10/2011 | Monteiro et al. | |
| 8,397,487 | B2 | 3/2013 | Sennoun et al. | |
| 2003/0111627 | A1* | 6/2003 | Winslow | F01D 17/105 251/206 |
| 2006/0162371 | A1 | 7/2006 | Lui et al. | |
| 2012/0045317 | A1 | 2/2012 | Saladino | |
| 2012/0180509 | A1* | 7/2012 | DeFrancesco | B64D 13/08 62/172 |
| 2013/0164115 | A1* | 6/2013 | Sennoun | F02C 7/185 415/1 |
| 2014/0000279 | A1* | 1/2014 | Brousseau | B64D 13/08 60/782 |
| 2015/0059397 | A1* | 3/2015 | Bruno | B64D 13/06 62/402 |
| 2015/0107261 | A1* | 4/2015 | Moes | B64D 13/06 60/783 |
| 2016/0347456 | A1* | 12/2016 | Bruno | B64D 13/06 |

FOREIGN PATENT DOCUMENTS

| | | | |
|---|---|---|---|
| EP | 2848534 | A1 | 3/2015 |
| EP | 2862803 | A1 | 4/2015 |

OTHER PUBLICATIONS

European Search Report and Communication; Application No. 16177182.9; dated Sep. 22, 2016; 10 pages.

* cited by examiner

ECS Pack
100
214
208
61
Algorithm
Controller
206
Fan air
212
160
Precooler
210
202
204
200

AIRCRAFT ENVIRONMENTAL CONTROL SYSTEM SELECTIVELY POWERED BY THREE BLEED PORTS

CROSS-REFERENCE TO RELATED APPLICATIONS

This application claims the benefit of U.S. patent application Ser. No. 14/088,557, filed on Nov. 25, 2013, and U.S. Provisional Patent Application Ser. No. 61/872,941 filed on Sep. 3, 2013, and the entire contents of which are herein incorporated by reference.

BACKGROUND

Embodiments of the present disclosure relate to aircraft environmental control systems, and more particularly, to a gas turbine engine compressor air supply of an aircraft environmental control system.

In a typical gas turbine engine, a compressor compresses air and passes that air along a primary flow path to a combustor where it is mixed with fuel and combusted. The combusted mixture expands and is passed to a turbine, which is forced to rotate due to the passing combusted mixture. When used on an aircraft, the primary purpose of this system is to provide propulsive force for the aircraft.

In some gas turbine engines, a portion of the air compressed by the compressor is diverted from the primary flow path to a bleed inlet of a bleed air system. This compressed bleed air can be used for a variety of purposes, such as to de-ice a wing or to provide pressurized air to a cabin of the aircraft. Because the bleed air is often at an undesirably high temperature, a heat exchanger is used to cool the bleed air. Bleeding off and cooling compressed air reduces thrust, thus reducing the efficiency of the compressor and the entire gas turbine engine. Moreover, the heat exchanger takes up a relatively large amount of space and can increase the overall weight of the bleed air system. The higher the pressure of the compressed bleed air the greater the efficiency debit to the gas turbine engine.

BRIEF DESCRIPTION

According to one embodiment of the disclosure, an engine compressor bleed system of an engine for an aircraft is provided including a plurality of compressor pressure ports configured to supply bleed air to satisfy a cooling load for at least a first stage of a flight profile of an aircraft. A first pressure port of the plurality of compressor pressure ports is configured to provide bleed air having a pressure at least equal to a cabin pressure of an aircraft and a temperature that does not exceed a predetermined threshold.

According to one embodiment of the disclosure, a method of operating a compressor bleed supply system of an engine for an aircraft is provided including identifying a flight condition of the aircraft. One of a plurality of pressure ports configured to supply bleed air is selected to satisfy a cooling load for the aircraft. A first pressure port of the plurality of pressure ports is configured to provide bleed air having a pressure at least equal to a cabin pressure of an aircraft and a temperature that does not exceed a predetermined threshold.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
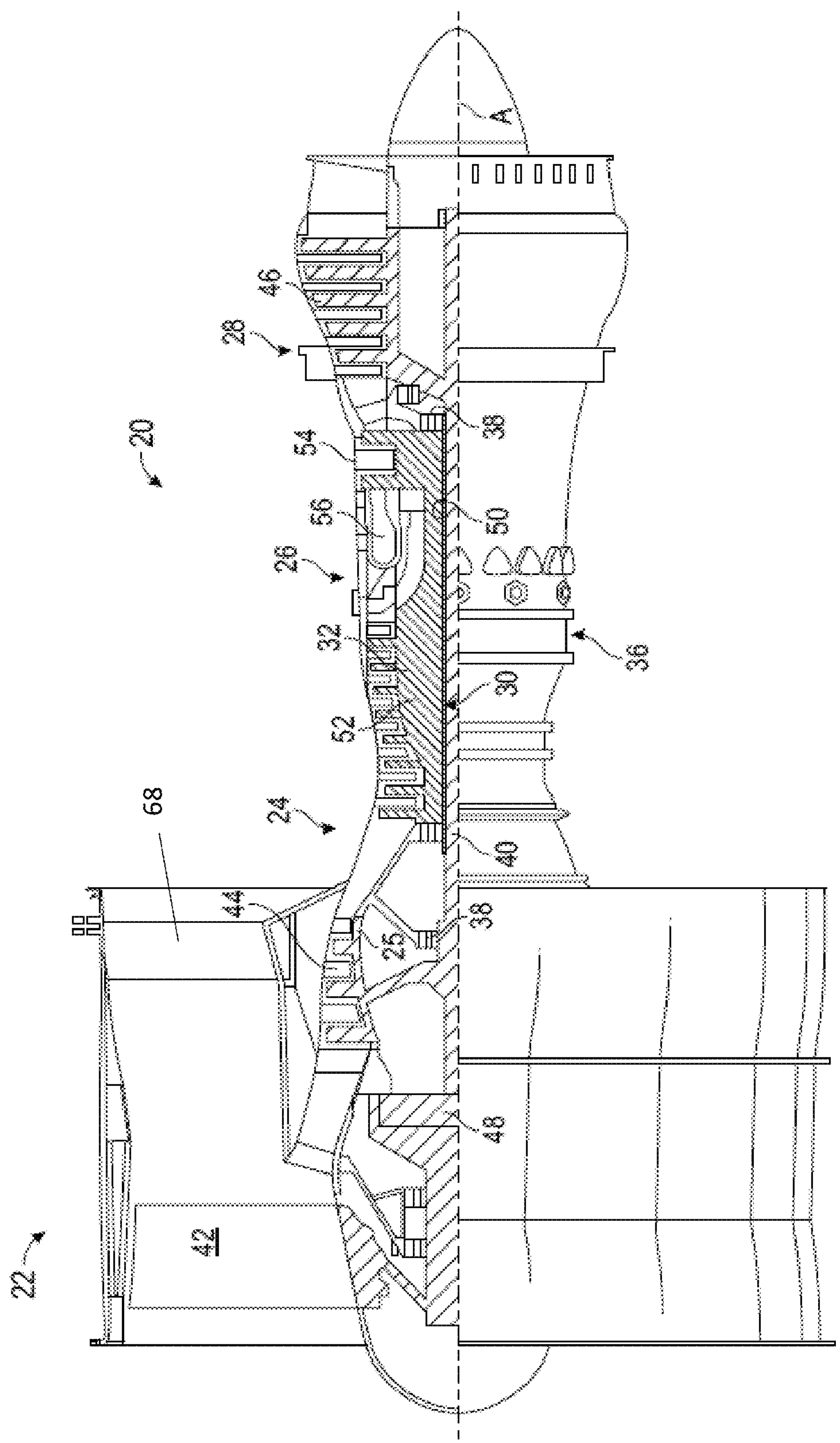
FIG. 1 is a cross-sectional view of a gas turbine engine of an aircraft.
Figure 2:
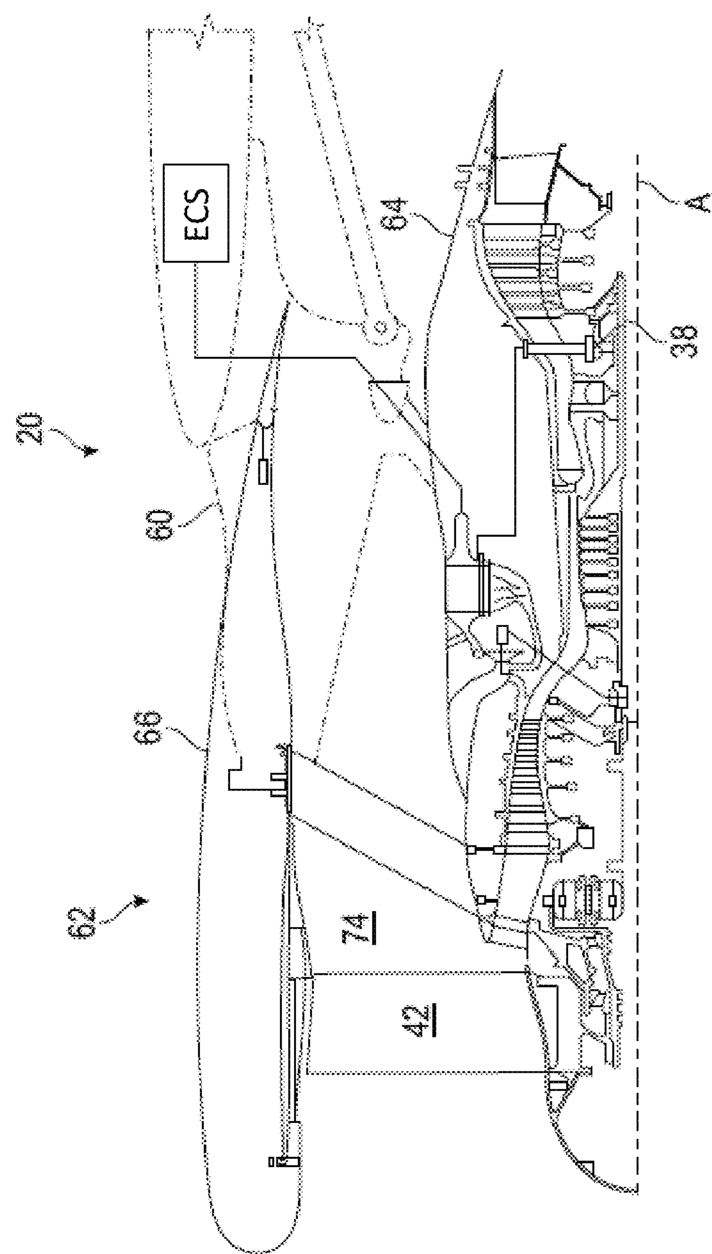
FIG. 2 is another cross-sectional view of a gas turbine engine within the nacelle assembly.

Referring now to FIGS. 1 and 2, an example of a gas turbine engine 20 configured for use in an aircraft is illustrated schematically. The gas turbine engine 20 disclosed herein is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 and then expansion through the turbine section 28. Although depicted as a turbofan gas turbine engine 20 in the disclosed non-limiting embodiment, it should be understood that the concepts described herein are not limited to use with turbofans as the teachings may be applied to other types of turbine engines, such as three-spool architectures for example.

The engine 20 generally includes a low spool 30 and a high spool 32 mounted for rotation about an engine central longitudinal axis A relative to an engine static structure 36 via several bearing systems 38. Although the engine 20 illustrated and described herein includes a high spool 32 and a low spool 30, other configurations, such as an engine 20 also including an intermediate spool (not shown) for example, are within the scope of the present disclosure. It should also be understood that bearing systems 38 at various locations may alternatively or additionally be provided.

The low spool 30 generally includes an inner shaft 40 that interconnects a fan 42, a low pressure compressor 44, and a low pressure turbine 46. The inner shaft 40 may be connected to the fan 42 directly or through a geared architecture 48 to drive the fan 42 at a different, typically lower speed than the low spool 30. The high spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 56 and low pressure turbine 46. The turbines 54, 46 rotationally drive the respective low spool 30 and high spool 32 in response to the expansion.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. It should be appreciated that the core nacelle 64 and the fan nacelle 66 may be of various configurations.

Figure 3:
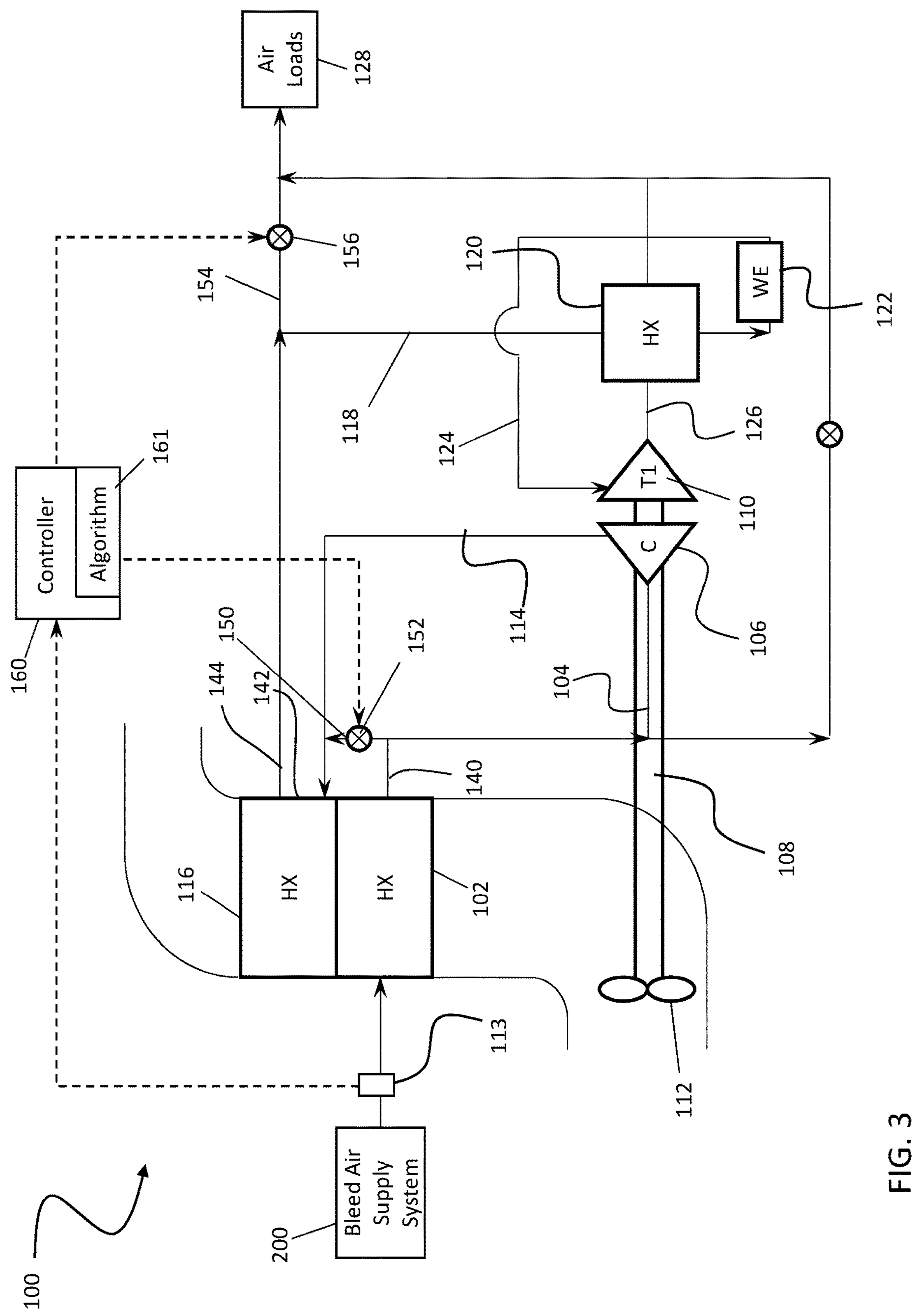
FIG. 3 is a schematic diagram of an ECS pack of an environmental control system (ECS) of an aircraft.
Figure 4:
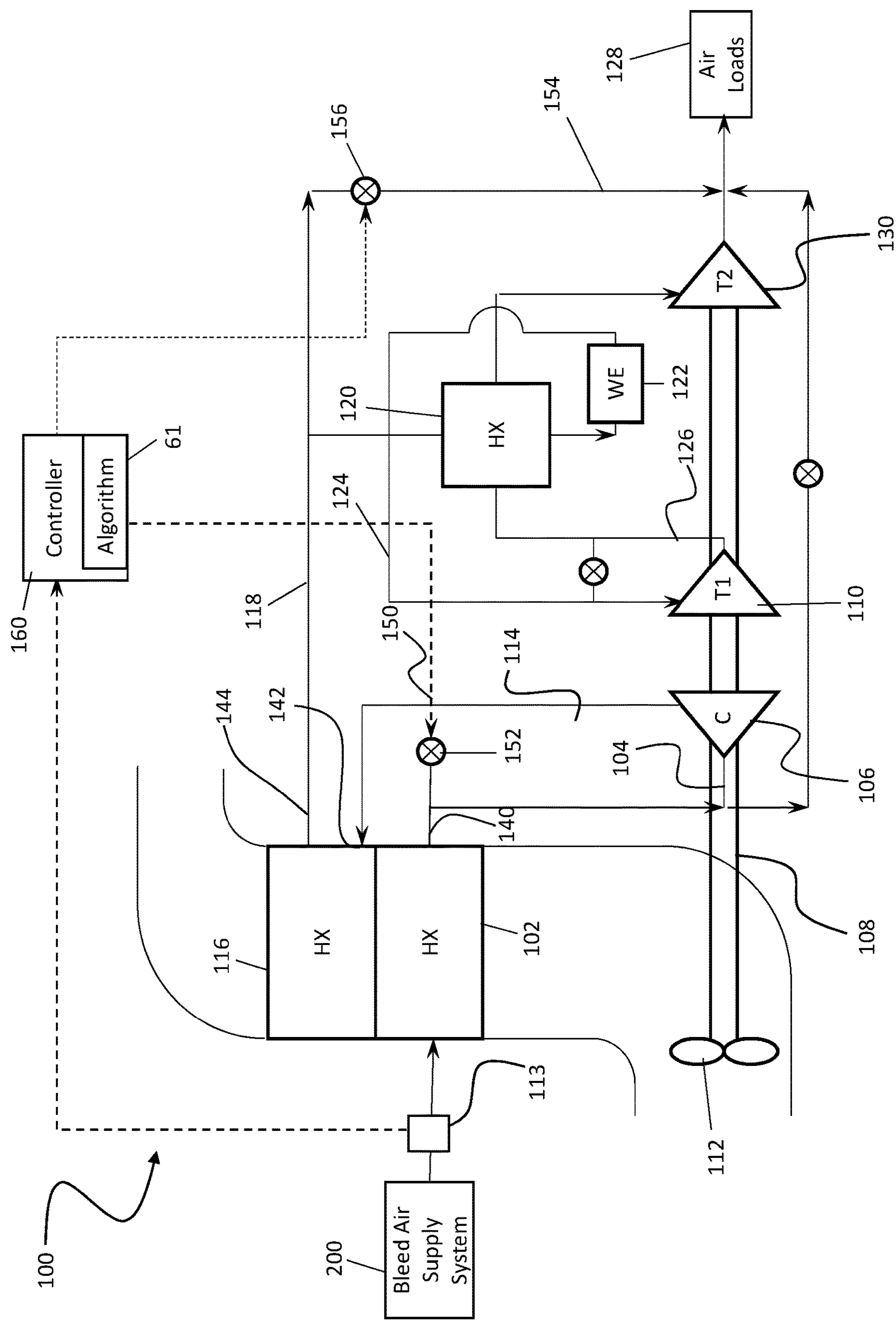
FIG. 4 is a schematic diagram of another ECS pack of an environmental control system (ECS) of an aircraft.
Figure 5:
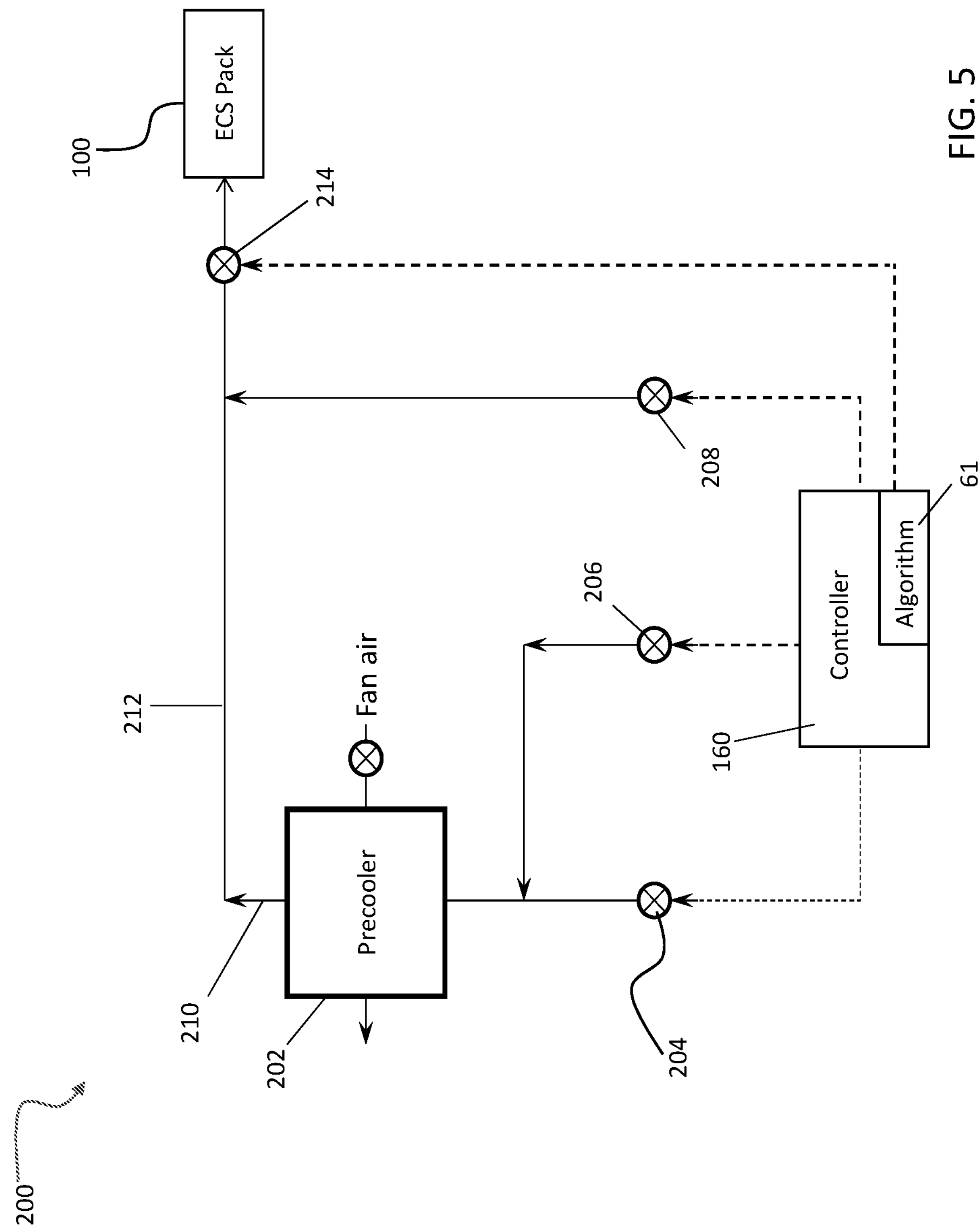
FIG. 5 is a schematic diagram of a bleed air supply system fluidly coupling a gas turbine engine and an ECS pack of an aircraft.

Referring now to FIGS. 3 and 4, each pack 100 of an environmental control system (ECS) of the aircraft is supplied with compressor bleed air from one of the gas turbine engines 20 by a compressor bleed air supply system 200 (see FIG. 5). The ECS may include any number of ECS packs 100 configured to supply conditioned air to various heat loads of the aircraft. Bleed air from the supply system 200 is input to a primary heat exchanger 102 such that the bleed air is in a heat exchange relationship with RAM or ambient air. After the bleed air is cooled in the primary heat exchanger 102, the resulting cooler air is communicated through a passage 104 to a compressor 106, where the bleed air is compressed to a high pressure. The compressor 106 may be located on a common shaft 108 with a first turbine 110 and a fan 112. Together the fan 112, compressor 106, and first turbine 110 define an air cycle machine (ACM).

Compressed air exits the compressor 106 through a passage 114 and is provided to a secondary heat exchanger 116 configured to further cool the compressed air by heat exchange with a RAM air flow. Compressed, cooled air bearing water vapor exits from the secondary heat exchanger 116 and flows through a duct 118 to a condensing heat exchanger 120. The condensing heat exchanger 120 is configured to further cool the air by condensing and separating the water into a water extractor 122. Dehumidified air exits the water extractor 122 and is provided, through a passage 124, to a first turbine 110. The bleed air is expanded and water vapor in the air is further condensed through the first turbine 110 of the ACM. The cooled air flows through a passage 126 back to the condensing heat exchanger 120, where the air is heated to a relatively warmed temperature, and is then supplied to the air loads (illustrated schematically at 128) of the aircraft, such as to the cabin for example.

The ECS pack 100 illustrated in FIG. 4, includes a second turbine 130 arranged on the shaft 108 of the fan 112, compressor 106, and first turbine 110. After the bleed flow exits from a second pass 126 through the condensing heat exchanger 120, the bleed air is provided to the second turbine 130, where the air is further expanded, before being provided to the air loads 128 of the aircraft. In one embodiment, a reheater (not shown) configured to further cool the bleed air may be arranged between the secondary heat exchanger 116 and the condensing heat exchanger 120. The three wheel (FIG. 3) and four wheel (FIG. 4) ACM ECS packs 100 described herein are for illustrative purposes only, and an ECS pack 100 having an ACM of another configuration is within the scope of the present disclosure.

Referring again to the ECS packs 100 illustrated in FIGS. 3 and 4, a first conduit 150 including a first valve 152 connects the outlet 140 of the primary heat exchanger 102 to the inlet 142 of the secondary heat exchanger 116. A second conduit 154 including a second valve 156 extends from outlet 144 of the secondary heat exchanger 116 to the plurality of air loads 128 of the aircraft. The first and second valve 152, 156 may be any type of valve, including but not limited to a check valve, ball valve, and butterfly valve for example. The first valve and the second valve are operably coupled to a controller 160 configured to move each of the valves between a first closed position and a second open position.

Each ECS pack 100 is configured to operate in a first normal mode and a second bypass mode. When the ECS pack 100 is in the first normal mode, the first valve 152 and the second valve 156 are closed such that the bleed air flows through the ACM in a conventional manner. When the ECS pack 100 is in the second, bypass mode, both the first valve 152 and the second valve 156 are at least partially open. When the first valve 152 is open, the majority of the bleed air will flow from the primary heat exchanger 102 directly to the secondary heat exchanger 116; however, a small portion of the bleed air will flow through the compressor 106. When the second valve 156 is open, the majority of the bleed air flows from the secondary heat exchanger 116 directly to the air loads 128 of the aircraft and only a small portion of the bleed air is provided to the turbine 110. The small amount of air provided to the turbine 110 via the second valve 156 allows for rotation of the ACM at a minimal operational speed to prevent failure thereof. In one embodiment, the air flow to the turbine 110 is controlled by the location of the second valve 156 within the ECS pack 100 and also by the flow rate of bleed air through the second valve 156.

The compressor bleed air supply system 200 configured to supply air from the gas turbine engine 20 to an ECS pack 100 is illustrated in more detail in FIG. 5. The compressor bleed air supply system 200 includes a precooler 202 which may be used to cool the compressor bleed air before it is provided to the ECS pack 100. The precooler 202 includes an air to air heat exchanger in fluid communication with a source of cooling air, such as the bypass air flow in the bypass flow path 74 for example.

The compressor bleed air supply system 200 includes a high pressure port 204, an intermediate pressure port 206, and a low pressure port 208, configured to bleed air from various portions of an engine 20. The high pressure port 204, intermediate pressure port 206, and low pressure port 208 are arranged such that the pressure of the bleed air provided at the high pressure port 204 generally exceeds the pressure of the bleed air provided from the intermediate pressure port 206. Similarly, the bleed air provided by the intermediate pressure port 206 has a pressure generally greater than the bleed air provided by the low pressure port 208. As a result, the temperature of the bleed air at the high pressure port 204 is warmest, the temperature of the bleed air at the low pressure port 208 is coolest, and the temperature of the bleed air at the intermediate port 206 is generally there between.

Figure 6:
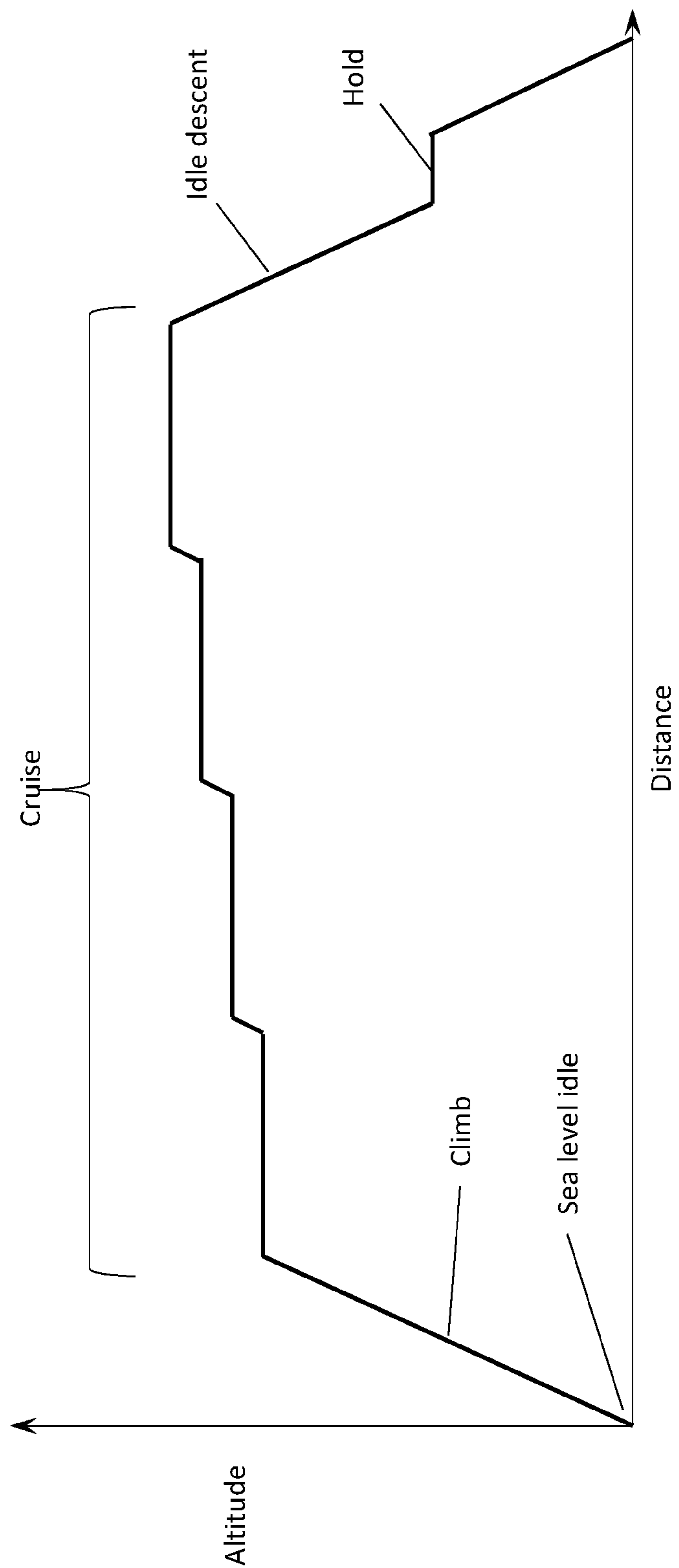
FIG. 6 is a schematic diagram of the various flight conditions that occur during a typical aircraft flight.

Referring now to FIG. 6, an example of the various flight conditions that occur during a typical flight of an aircraft are illustrated. Upon takeoff, the aircraft begins to climb until reaching a desired cruising altitude, typically between 35000 and 43000 feet for a large commercial aircraft. When preparing to land, after flying a desired distance, the aircraft enters into a descent where one of more of the engines 20 are idle. In some instances, such as in the event of excessive incoming and outgoing traffic at an airport, the aircraft may enter into a hold condition at some altitude below the cruising altitude.

The position of the ports 204, 206, 208 may vary based on the configuration of the aircraft and the type of engines being used. In addition, by positioning one or more of the ports 204, 206, 208 an optimized position relative to an engine 20, the operational efficiency of the ECS pack 100 during one or more of the flight conditions as shown in FIG. 6 may be maximized. In one embodiment, the compressor bleed air supply system 200 is configured to draw air from the high pressure port 204 when the aircraft is in an idle condition, such as when the aircraft is stationary on the ground or when the aircraft is in a descent for example. Generally during an idle or descent flight condition, the engine 20 from which the port 204 is configured to bleed air operates at the minimum allowable engine speed to prevent engine stall or other adverse flight conditions. When arranged at the optimized position, the bleed air provided by the high pressure port 204 during an idle or descent condition has a pressure generally equal to or greater than the pressure of the cabin.

Similarly, the compressor bleed air supply system 200 may be configured to draw air from the intermediate pressure port 206 when the aircraft is in a hold position. When arranged at the optimized position, the intermediate pressure port 206 is configured to provide bleed air having a pressure at least equal to a minimum pressure required to operate an anti-ice system of the aircraft, such as a pneumatic wing anti-ice system for example. The compressor bleed air supply system 200 is configured to draw air from the low pressure port 208 during the remaining flight conditions, such climb, and cruise for example. When the low pressure port is located at an optimized position, during one or more of the remaining flight conditions, the low pressure port 208 is configured to provide bleed air having a pressure generally equal to or greater than the pressure of the cabin in the aircraft during a climb, or cruise flight condition. In addition, a temperature of the bleed air drawn through the low pressure port 208 during climb, or cruise must not exceed a temperature greater than a predetermined temperature. The predetermined temperature may be 475° F. during transient conditions of the aircraft, and 450° F. during steady state conditions of the aircraft.

In one embodiment, the high pressure port 204 is arranged adjacent an end of the high pressure compressor 52 and the intermediate pressure port is located adjacent a central portion of the high pressure compressor 52 when in an optimized position. The low pressure port 208 may be configured to bleed air from a portion of the high spool 32, from a portion of the low spool 30, or from between the high spool 32 and low spool 30. Alternatively, in embodiments where the engine 20 additionally includes an intermediate spool, any of the ports 204, 206, 208 may be configured to draw bleed air directly from the intermediate spool, or from an area between the intermediate spool and the adjacent high pressure spool 32 or low pressure spool 30.

Referring again to FIG. 5, a valve at each port 204, 206, 208 is operably coupled to a controller 160. The controller 160 may be the same controller configured to operate the plurality of valves 152, 156 of the ECS packs 100, or alternatively, may be different. The controller 160 is configured to operate the valves that control the flow of bleed air from each of the ports 204, 206, 208. In one embodiment, only one of the high pressure port 204, intermediate pressure port 206, and low pressure port 208 of a compressor bleed air supply system 200 is open at any given time. It should be understood that various types of valves and control strategies may be used, including check valves that are controlled indirectly by pressure changes in the system as a result of opening or closing other valves in the bleed air supply system.

Under certain flight conditions, when the temperature and pressure of the ambient air combined with the power setting of the turbine engine result in the temperature of the bleed air at the low pressure port 208 exceeding a predefined threshold, such as 475° F. for example, the controller 160 opens both the intermediate pressure port 206 and the low pressure port 208. The bleed air from the intermediate pressure port 206, cooled by the precooler 202, is mixed with the warmer bleed air from the low pressure port 208 to generate a resultant air mixture having a temperature below the predefined threshold. In order to reduce the total amount of efficiency lost in the turbine engine the amount of cool air from the intermediate pressure port 208 provided is the minimum required to achieve a temperature of the resultant air mixture below the predefined threshold.

The high pressure port 204 and the intermediate pressure port 206 are both fluidly coupled to the precooler 202 such that bleed air drawn through either port 204, 206 first passes through the precooler 202 before being provided to an ECS pack 100. As the air is cooled in the precooler 202, a pressure drop occurs in the air provided thereto from either the high pressure port 204 or the intermediate pressure port 206. The low pressure port 208 is fluidly coupled to a conduit 212 extending from the outlet 210 of the precooler 202 to the ECS pack 100. Because the bleed air supplied at the low pressure port 208 is generally cooler than the air from the intermediate or high pressure port 204, 206, the low pressure bleed air does not need to be cooled before being supplied to the ECS pack 100. As a result, air from the low pressure port 208 bypasses the precooler 202 and is supplied directly to the ECS pack 100. In one embodiment, a valve 214 is arranged within the conduit 212 adjacent to the inlet 101 of the ECS pack 100. The controller 160 is operably coupled to the valve 214 and is configured to regulate the flow of bleed air into the ECS pack 100.

Referring to the controller 160 shown therein, the controller 160 includes an algorithm 61 configured to determine which pressure port (i.e. the high pressure port 204, intermediate pressure port 206, or low pressure port 208) of each bleed air supply system 200 to open and also what mode to operate a corresponding ECS pack 100 receiving the bleed air supplied from each system 200. The algorithm optimizes the energy of the aircraft as a function of the environmental conditions of the day, the altitude of the aircraft, and the mode of flight (e.g. climb, cruise, descend), the engine operating pressure and a difference in temperature between the supplied bleed air as measured by sensor 113 and the demand of the air loads 128. For example, when the temperature of the bleed air is significantly warmer than the temperature demand of the air load 128 for the cabin, the controller 160 is generally configured to operate an ECS pack 100 in the first, normal mode so that the bleed air may be cooled additionally by the ACM. Alternatively, when the temperature of the bleed air is less than or close to the temperature demand of the air load 128, the controller 160 is generally configured to operate an ECS pack 100 in the second, bypass mode. Similarly, the pressure port 204, 206, 208 of each supply system 200 used to provide bleed air may be selected in part based on the pressure required to operate the ACM of a corresponding ECS pack 100.

In some instances, as in conventional aircrafts, the controller 160 may use the same high pressure, intermediate pressure, or low pressure port 204, 206, 208 of each supply system 200 of the aircraft to supply bleed air from a plurality of engines 20 to a plurality of corresponding ECS packs 100. As a result, each of the plurality of ECS packs 100 generally operates in the same first normal mode, or second bypass mode. In another embodiment, the controller 160 may use a first pressure port, such as the intermediate pressure port 206 for example, to supply bleed air from at least one engine 20 to at least one corresponding ECS pack 100 and the controller may use a second pressure port, different from the first pressure port, such as the low pressure port for example, to supply bleed air from another engine 20 to at least another ECS pack 100. In embodiments where the supply systems 200 use different ports, the ECS pack 100 configured to receive bleed air from the first supply system 200 may be configured to operate in either the first normal mode or the second bypass mode. Similarly, the ECS pack 100 configured to receive bleed air from the second supply system 200 may be configured to operate in the same mode, or in a different mode, as the other ECS packs 100.

Inclusion of a low pressure port 208 in the compressor air bleed supply systems 200 and inclusion of bypass valves configured to minimize the flow through the ACM in the ECS pack 100, limit the additional cooling required of the bleed air. By optimally selecting from the three available pressure ports (204, 206, and 208) the aircraft's environmental control system can be operated in the most efficient mode, thereby reducing the overall bleed related penalties and improving the fuel burn of the aircraft over the duration of a normal flight profile.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of operating an engine compressor bleed system of an engine for an aircraft, the engine compressor bleed system comprising a plurality of compressor pressure ports configured to supply bleed air to satisfy a cooling load for at least a first stage of a flight profile of the aircraft, wherein a first compressor pressure port of the plurality of compressor pressure ports is configured to provide a first bleed air flow having a first pressure at least equal to a cabin pressure of the aircraft during a climb or a cruise flight condition of the aircraft and a first temperature that does not exceed a predetermined threshold, wherein the first stage of the flight profile is the climb or cruise flight condition, the engine compressor bleed system further comprising a precooler, wherein the first compressor pressure port of the plurality of compressor pressure ports is configured to direct an entirety of the first bleed air flow along a bypass pathway bypassing the precooler, wherein a second compressor pressure port of the plurality of compressor pressure ports is configured to direct a second bleed air flow from the second compressor pressure port through the precooler, the second bleed air flow having a second pressure greater than the first pressure, and wherein a third compressor pressure port of the plurality of compressor pressure ports is configured to direct a third bleed air flow from the third compressor pressure port through the precooler, the engine compressor bleed system further comprising a precooler outlet conduit downstream of the precooler configured to mix the entirety of the first bleed air flow and the second bleed air flow upstream of an inlet of an air to air heat exchanger of an environmental control system, the engine compressor bleed system further comprising a first bleed air flow conduit providing the bypass pathway, the first bleed air flow conduit being connected to the first compressor pressure port and the precooler outlet conduit, the first bleed air flow conduit configured to receive the entirety of the first bleed air flow from the first compressor pressure port and deliver the entirety of the first bleed air flow to the precooler outlet conduit, bypassing the precooler, wherein a second bleed air flow conduit and a third bleed air flow conduit are configured to deliver the second bleed air flow and the third bleed air flow, respectively, to the precooler, wherein the engine compressor bleed system is configured such that as an entirety of the second bleed air flow and an entirety of the third bleed air flow are directed through the precooler, the entirety of the first bleed air flow is delivered to the precooler outlet conduit, bypassing the precooler, wherein the engine includes at least two selected from the following: a high pressure spool, an intermediate pressure spool, and a low pressure spool, and wherein the first compressor pressure port is configured to bleed air from the high pressure spool, the method comprising:

identifying a flight condition of the aircraft;

selecting one of the plurality of compressor pressure ports to supply bleed air to satisfy the cooling load for the aircraft; and supplying the first bleed air flow at the first pressure and at the first temperature.

2. The method of operating the engine compressor bleed supply system according to claim 1, wherein the predetermined threshold is 475° F.

3. An engine compressor bleed system of an engine for an aircraft, comprising:

a plurality of compressor pressure ports configured to supply bleed air to satisfy a cooling load for at least a first stage of a flight profile of the aircraft, wherein a first compressor pressure port of the plurality of compressor pressure ports is configured to provide a first bleed air flow having a first pressure at least equal to a cabin pressure of the aircraft during a climb or a cruise flight condition of the aircraft and a first temperature that does not exceed a predetermined threshold, wherein the first stage of the flight profile is the climb or cruise flight condition;

a precooler, wherein the first compressor pressure port of the plurality of compressor pressure ports is configured to direct an entirety of the first bleed air flow along a bypass pathway bypassing the precooler, wherein a second compressor pressure port of the plurality of compressor pressure ports is configured to direct a second bleed air flow from the second compressor pressure port through the precooler, the second bleed air flow having a second pressure greater than the first pressure, and wherein a third compressor pressure port of the plurality of compressor pressure ports is configured to direct a third bleed air flow from the third compressor pressure port through the precooler;

a precooler outlet conduit downstream of the precooler configured to mix the entirety of the first bleed air flow and the second bleed air flow upstream of an inlet of an air to air heat exchanger of an environmental control system; and a first bleed air flow conduit providing the bypass pathway, the first bleed air flow conduit being connected to the first compressor pressure port and the precooler outlet conduit, the first bleed air flow conduit configured to receive the entirety of the first bleed air flow from the first compressor pressure port and deliver the entirety of the first bleed air flow to the precooler outlet conduit, bypassing the precooler;

wherein a second bleed air flow conduit and a third bleed air flow conduit are configured to deliver the second bleed air flow and the third bleed air flow, respectively, to the precooler;

wherein the engine compressor bleed system is configured such that as an entirety of the second bleed air flow and an entirety of the third bleed air flow are directed through the precooler, the entirety of the first bleed air flow is delivered to the precooler outlet conduit, bypassing the precooler;

wherein the engine includes at least two selected from the following: a high pressure spool, an intermediate pressure spool, and a low pressure spool; and wherein the first compressor pressure port is configured to bleed air from the high pressure spool.

4. The engine compressor bleed system according to claim 1, wherein the predetermined threshold is 475° F.

5. The engine compressor bleed system according to claim 1, wherein the second compressor pressure port is configured to provide the second bleed air flow at the second pressure, the second pressure being at least equal to the cabin pressure of the aircraft when the aircraft is in a second stage of the flight profile.

6. The engine compressor bleed system according to claim 5, wherein in the second stage of the flight profile, the aircraft is in a descent and the engine is operating at a minimum allowable speed.

7. The engine compressor bleed system according to claim 5, wherein the third compressor pressure port is configured to provide the third bleed air flow at a third pressure, the third pressure being between the first pressure and the second pressure.

8. The engine compressor bleed system according to claim 7, wherein the third pressure is at least equal to a minimum pressure necessary for operation of an anti-ice system.

9. The engine compressor bleed system according to claim 8, wherein the anti-ice system is a pneumatic wing anti-ice system.

* * * * *